United States Patent
Chen

(10) Patent No.: US 7,714,462 B2
(45) Date of Patent: May 11, 2010

(54) COMPOSITE BACKUP-TYPE POWER SUPPLY SYSTEM

(75) Inventor: Yun-Chen Chen, Taipei Hsien (TW)

(73) Assignee: Zippy Technology Corp., Taipei Hsien (TW)

(*) Notice: Subject to any disclaimer, the term of this patent is extended or adjusted under 35 U.S.C. 154(b) by 139 days.

(21) Appl. No.: 11/482,170

(22) Filed: Jul. 7, 2006

(65) Prior Publication Data

US 2008/0024011 A1    Jan. 31, 2008

(51) Int. Cl.
*H02J 9/00* (2006.01)
(52) U.S. Cl. ......................................... 307/65
(58) Field of Classification Search .................. 307/65, 307/64
See application file for complete search history.

(56) References Cited

U.S. PATENT DOCUMENTS

| | | | |
|---|---|---|---|
| 4,576,043 A | 3/1986 | Nguyen et al. | |
| 5,551,305 A | 9/1996 | Farchi et al. | |
| 5,741,977 A | 4/1998 | Agar et al. | |
| 5,861,684 A * | 1/1999 | Slade et al. | 307/66 |
| 6,385,024 B1 * | 5/2002 | Olson | 361/87 |
| 6,677,687 B2 * | 1/2004 | Ho et al. | 307/43 |
| 6,958,552 B2 * | 10/2005 | Dodson, III | 307/52 |
| 7,265,458 B2 * | 9/2007 | Edelen et al. | 307/65 |
| 2002/0135232 A1 * | 9/2002 | McMillan | 307/23 |
| 2005/0073783 A1 * | 4/2005 | Luo et al. | 361/62 |

FOREIGN PATENT DOCUMENTS

| | | |
|---|---|---|
| GB | 1 208121 | 10/1970 |
| WO | WO 02 46706 | 6/2002 |

* cited by examiner

*Primary Examiner*—Jared J Fureman
*Assistant Examiner*—Michael Rutland Wallis
(74) *Attorney, Agent, or Firm*—Muncy, Geissler, Olds & Lowe, PLLC

(57) ABSTRACT

A composite backup-type power supply system can be configured and assembled to become a small backup-type power supply system or a large backup-type power supply system according to actual requirements. In a condition of a lower loading requirement, one power supply unit consisting of M+P sets of power supply devices can be selected to connect to a main power panel to form the small backup-type power supply system. When the load increases, extra N sets of power supply units each consisting of M+P sets of power supply devices can be added, and N+1 sets of power supply units are connected to the main power panel so that all the base power supply devices and backup power supply devices can be integrated to form the large backup-type power supply system.

5 Claims, 2 Drawing Sheets

COMPOSITE BACKUP-TYPE POWER SUPPLY SYSTEM

BACKGROUND OF THE INVENTION

1. Field of the Invention

The present invention relates to a composite backup-type power supply system and particularly to a backup-type power supply system formed by coupling a power supply unit consisting of M+P sets of power supply devices with another or more power supply units consisting of same or different numbers of M+P power supply devices through a power integration platform.

2. Brief Discussion of the Related Art

A conventional backup-type power supply system usually consists of a plurality of power supply devices which adopt a common structural design. Namely a plurality of power supply devices share one chassis and a controlling power integration panel. In practice a N+1 architecture is commonly adopted. Take a 1+1 architecture as an example. It consists of two power supply devices. In the event that one of the power supply devices malfunctions, another power supply device can still function normally to provide electric power. According to different requirements, an N+2 architecture may also be adopted.

However, the specifications of the present backup-type power supply system still cannot fully and flexibly meet user's expansion requirements. This is mainly because the backup specification is fixed. For instance, if a backup-type power supply system adopts a 3+1 architecture, in the event that the actual demand requires a 1+1 architecture, the extra two sets of power supply devices are added by taking into account of future expansion purpose. This could result in a real power and dummy power sharing the same structure. Namely, the real power is the 1+1 architecture actually being used, while the extra two sets are dummy power. When user's demand increases, additional two sets of real power are procured to replace the dummy power to form the backup-type power supply system of the 3+1 architecture. In such a condition, the dummy power is useless. Moreover, in the event that the host has to be expanded to a backup-type power supply system in a 5+1 architecture, the original 3+1 architecture cannot be upgraded again. And a new backup-type power supply system of the 5+1 architecture has to be procured. It is a heavy burden to users.

SUMMARY OF THE INVENTION

The primary object of the present invention is to solve the aforesaid disadvantages. The present invention provides a composite backup-type power supply system that can be flexibly configured and assembled to become a small backup-type power supply system or a large backup-type power supply system according to actual requirements. In the condition of a small loading requirement a power supply unit consisting of M+P power supply devices can be chosen to link to a main power panel to form a small backup-type power supply system. When the load increases, and extra N sets of power supply units that contain M+P power supply devices have to be added, N+1 sets of power supply units can be linked to the main power panel to integrate all the base power supply devices and the backup power supply devices to form a large backup-type power supply system.

To achieve the foregoing object, the invention provides a main power panel to be coupled with N+1 sets of power supply units. Each of the power supply units contains M+P sets of power supply devices and at least one sub-power panel to integrate output power of the M+P sets of power supply devices. Each set of power supply unit also has at least one power balance unit to regulate output power ratio of the M+P sets of power supply devices. When only one set of the power supply unit is linked to the main power panel, it forms a small backup-type power supply system consisting of M+P sets of power supply devices. The main power panel has a power detection linking line connecting to each set of power supply unit. When N+1 sets of power supply units are linked to the main power panel, all the base power supply devices and the backup power supply devices are integrated to form a large backup-type power supply system.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
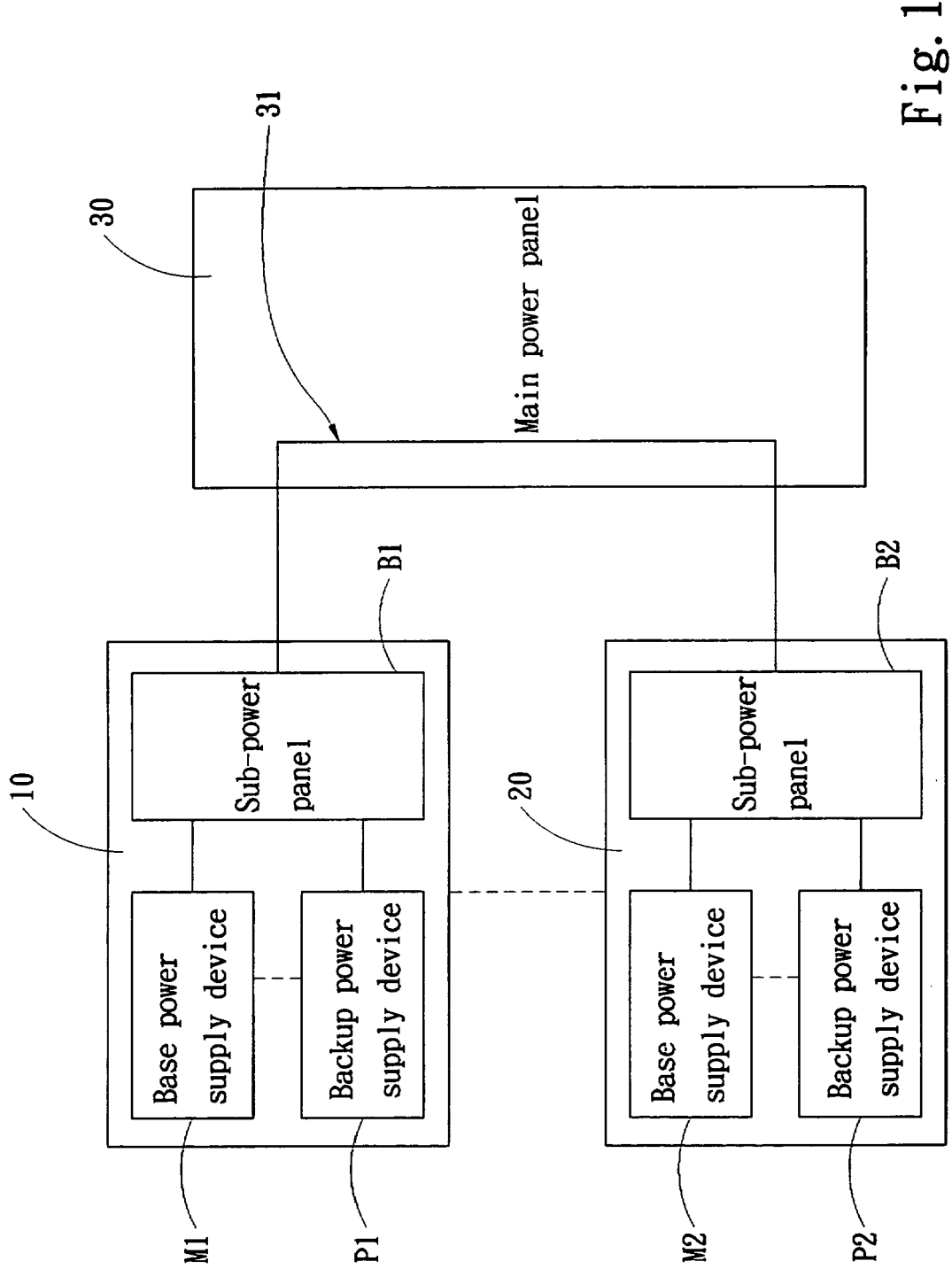
FIG. 1 is a schematic circuit block diagram of the present invention.
Figure 2:
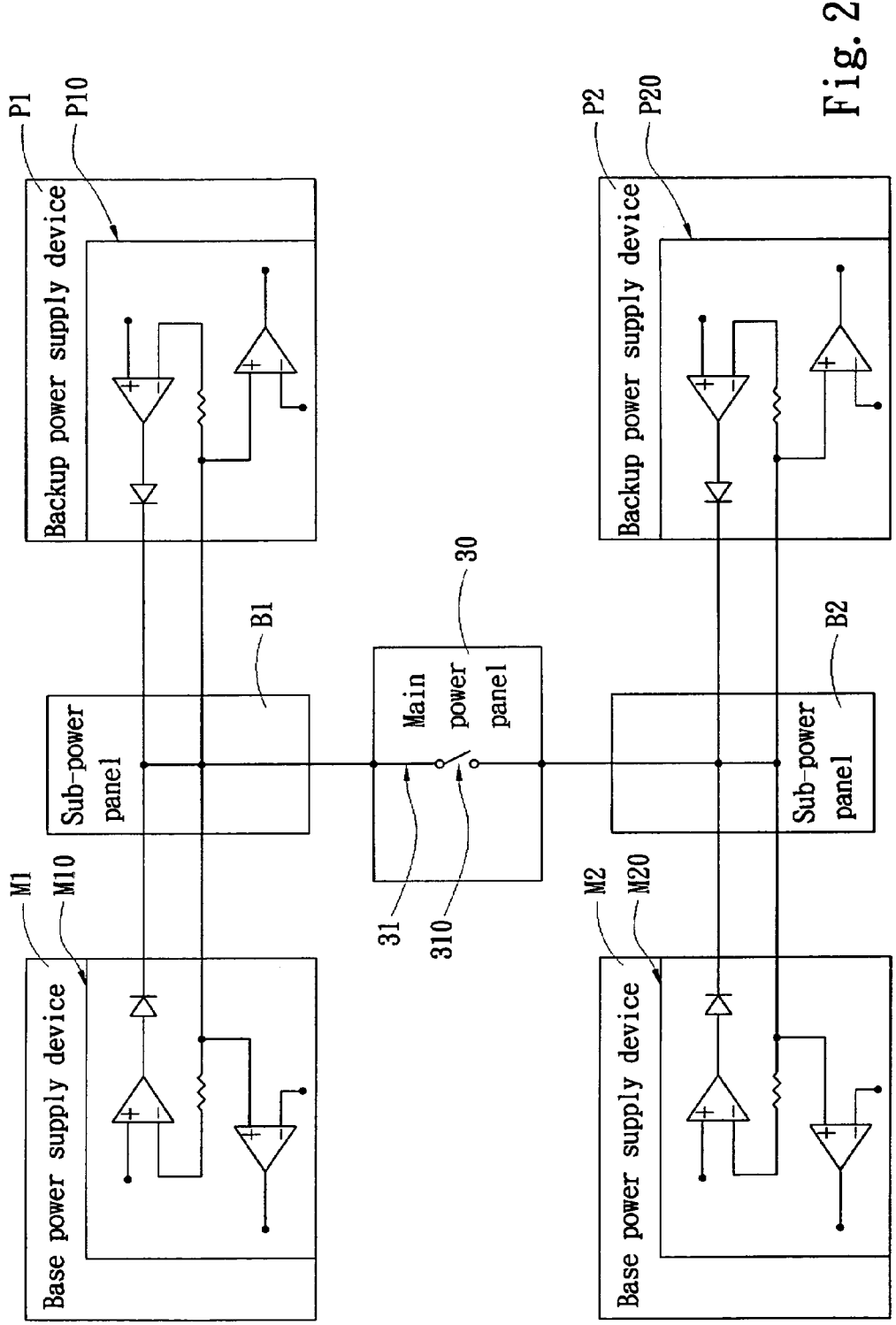
FIG. 2 is a schematic circuit diagram of an embodiment of the present invention.

Please refer to FIGS. 1 and 2, the composite backup-type power supply system of the invention mainly aims to provide a power integration platform for N+1 sets of power supply units 10 and 20 so that users can select one set of power supply units 10 and 20 to form a small backup-type power supply system, or a plurality sets of power supply units 10 and 20 to form a large backup-type power supply system. Each set of the power supply units 10 and 20 consists of M+P sets of power supply devices M1 and P1, and M2 and P2. M refers to base power supply devices M1 and M2, while P refers to backup power supply devices P1 and P2. At least one sub-power panel B1 and B2 is provided to integrate output power of the M+P sets of power supply devices M1, P1, M2 and P2. Each set of the power supply units 10 and 20 has at least one power balance unit M10 and P10, and M20 and P20 to regulate output power ratio of the M+P sets of power supply devices M1, P1, M2 and P2, where $N \geq 1$, $M \geq 1$, and $P \geq 1$. The invention further provides at least one main power panel 30 connecting to the sub-power panels B1 and B2 to integrate output power of the N+1 sets of power supply units 10 and 20. The main power panel 30 has a power detection linking line 31 connecting to each set of the power supply units 10 and 20 so that each of the power supply units 10 and 20 is connected to the main power panel 30 to form a small backup-type power supply system of M+P sets of power supply devices M1, P1, M2 and P2. N+1 sets of power supply units 10 and 20 are connected to the main power panel 30 to integrate all the base power supply devices M1 and M2, and backup power supply devices P1 and P2 to form a large backup-type power supply system.

To facilitate discussion, an embodiment presented below takes N=1, P=1 and M=1 as an example. When only one set of power supply units 10 and 20 is selected, it is defined as a small backup-type power supply system in a 1+1 architecture. When a plurality of sets of the power supply units 10 and 20 are selected, it is defined as a large backup-type power supply system in a 3+1 architecture.

The power balance units M10, P10, M20 and P20 may be selectively installed on the power supply devices M1, P1, M2 and P2, sub-power panels B1 and B2, or main power panel 30 according to different design specifications. In this embodiment each of the power supply devices M1, P1, M2 and P2 has a power balance unit M10, P10, M20 and P20. As shown in the drawings, the base power supply devices M1 and M2, and the backup power supply devices P1 and P2 of each set of power supply units 10 and 20 are connected through the sub-power panel B1 and B2. Each of power balance units M10, P10, M20 and P20 receives output power from another set of power supply devices M1, P1, M2 and P2 through a detection point, which is at the point where the sub-power panel is connected to the main panel, and a self feedback control is executed to regulate power of the power supply devices M1, P1, M2 and P2. Meanwhile, one set of the power supply units 10 and 20 forms a backup-type power supply system in a 1+1 architecture. When a second set of power supply units 10 and 20 is connected to the main power panel 30, the power detection linking line 31 on the main power panel 30 is connected serially to the first set of power supply unit 10 and the second set of power supply unit 20. Then power regulation of the power supply devices M1, P1, M2 and P2 of the first and second power supply units 10 and 20 is not merely done according to power using condition of extra power supply devices M1, P1, M2 and P2 of the individual power supply units, through the power detection linking line 31 power use information of the power supply devices M1, P1, M2 and P2 of another set of power supply units 10 and 20 can be obtained, thereby power regulation can be done synchronously. Thus it becomes a large backup-type power supply system in a 3+1 architecture.

According to system expansion requirements, the connection points of the power detection linking line 31 on the main power panel 30 can be expanded without limit to electrically connect to multiple sets of power supply units 10 and 20. Thus the invention can be upgraded and expanded to fully meet user's future upgrade and expansion requirements. In addition, the power detection linking line 31 further has a connection switch 310 located between two neighboring power supply units 10 and 20. Through the connection switch 310, a first and a second set of power supply units 10 and 20 can be selected to form a backup-type power supply system in a 3+1 architecture. It also can be switched to become two sets of backup-type power supply systems in a 1+1 architecture. Thus the invention can be flexibly adopted in response to varying system requirements.

While the preferred embodiments of the invention have been set forth for the purpose of disclosure, modifications of the disclosed embodiments of the invention as well as other embodiments thereof may occur to those skilled in the art. Accordingly, the appended claims are, intended to cover all embodiments which do not depart from the spirit and scope of the invention.

What is claimed is:

1. A composite backup-type power supply system, comprising:

N+1 sets of power supply units each having M+P sets of power supply devices, where M being base power supply devices, P being backup power supply devices, each of the power supply units having at least one power balance unit to regulate output power ratio of the M+P sets of power supply devices, each power balance unit receives supplied output power only from a power output of another set of power supply devices through a detection point, and provides a self feedback control to regulate power of the power supply devices, where $N \geq 1$, $M \geq 1$ and $P \geq 1$;

N+1 sub-power panels corresponding to the N+1 sets of power supply units to integrate output power of the M+P sets of power supply devices into a single output power; and at least one main power panel connecting to the sub-power panels at said detection point to integrate output power of the N+1 sets of power supply units; the main power panel having a power detection linking line connecting to each of the power supply units so that each of the power supply units connected to the main power panel becomes a small backup-type power supply system in a 1+1 architecture consisting of M+P sets of power supply devices; the N+1 sets of power supply units connected to the main power panel having all the base power supply devices and the backup power supply devices integrated to become a large backup-type power supply system in a 3+1 architecture.

2. The composite backup-type power supply system of claim 1, wherein the power balance units are located in the power supply devices.

3. The composite backup-type power supply system of claim 1, wherein the power balance units are located on the sub-power panel.

4. The composite backup-type power supply system of claim 1, wherein the power balance units are located on the main power panel.

5. The composite backup-type power supply system of claim 1, wherein the power detection linking line has a connection switch located between two neighboring power supply units.

* * * * *